May 26, 1970  J. J. REILLY, JR  3,513,699
ADIABATIC CALORIMETER
Filed Nov. 9, 1967
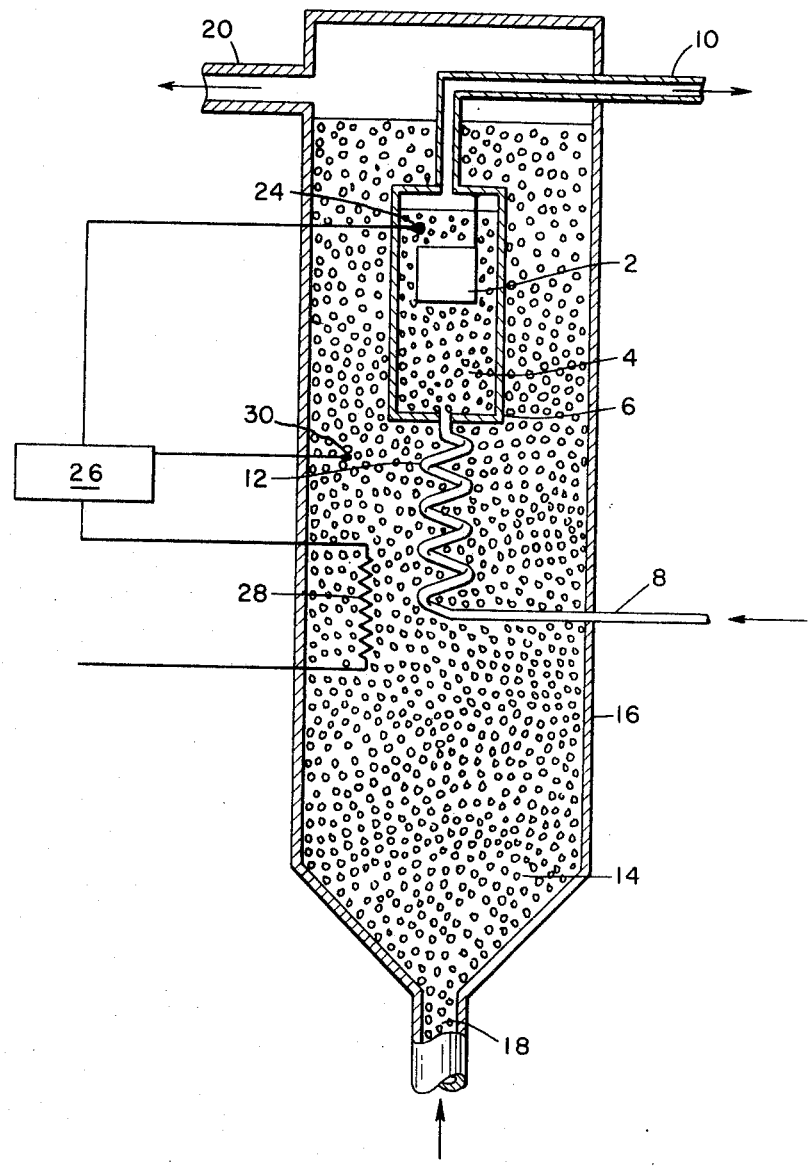
INVENTOR.
JAMES J. REILLY JR.
BY

United States Patent Office 3,513,699
Patented May 26, 1970

3,513,699
ADIABATIC CALORIMETER
James J. Reilly, Jr., Bellport, N.Y., assignor to the United
States of America as represented by the United States
Atomic Energy Commission
Filed Nov. 9, 1967, Ser. No. 681,635
Int. Cl. G01k 17/00
U.S. Cl. 73—190                                    1 Claim

ABSTRACT OF THE DISCLOSURE

An adiabatic calorimeter having a reaction chamber immersed in a first fluidized bed, which bed is immersed in a second separate fluidized bed, wherein thermal effects generated in the chamber are determined from the temperature change of the fluidized medium of the first bed, with the second bed preventing heat loss from the first bed.

BACKGROUND OF THE INVENTION

The invention described herein was made in the course of, or under a contract with the U.S. Atomic Energy Commission.

Accurate calorimetric measurements are useful in carrying out the thermodynamic studies in the design of chemical plants.

Liquid adiabatic calorimeters are known to those skilled in the art. In general, these usually contain a reaction chamber immersed in a liquid of a first vessel, and this first vessel is contained in the liquid of a second vessel. The thermal effect from a reaction conducted in the chamber is ascertained from the temperature fluctuation of the liquid in the first vessel caused by the reaction. The second vessel having means to adjust its temperature to maintain it at a constant level with the liquid in the first vessel.

Such liquid calorimeters are subject to many possible errors, such as heat leakage from the first to the second vessel due to the inherent lag in the response to thermal changes between the separate liquids. Evaporation of the liquids and non-uniformity of temperature throughout the liquids also introduce errors. Further, there are temperature limitations on the type of reactions which can be measured, due to the boiling points of liquids capable of being used in such systems. Thus the art has long sought a calorimeter which will accurately measure the thermal effects of high temperature reactions.

SUMMARY OF THE INVENTION

This invention discloses an adiabatic calorimeter for use in accurately measuring the thermal effects of processes at high temperatures comprising first and second fluidized bed reactors having fludized beds of particulate solids fluidized by gaseous fluidizing mediums contained in separate walled reactor vessels having separate fluidizing mediums and separate medium inlet and egress means for each reactor vessel; the walls of the vessel of the first reactor being completely immersed in the fluidized bed of the second reactor; temperature sensing means 24 for measuring the temperature of the fluidized bed in the first reactor; a second temperature sensing means 30 for measuring the temperature of the fluidized bed of the first reactor; heating means operably connected with the fluidized bed of the second reactor and capable of maintaining the second fluidized bed at a temperature equal to that shown by the temperature sensing means 24; a process vessel, for carrying out reactions immersed in the fluidized bed contained in the first fluidized bed reactor below the temperature sensing means, for carrying out processes generating a thermal effect.

The figure shows a cross-sectional view diagrammatically illustrating typical apparatus constructed in accordance with the practice of this invention.

Referring to said drawing in detail, the method of using any calorimeter is as follows:

The reactant materials upon which calorimetric measurements are to be made are placed in a sealed process vessel 2, the process vessel 2 is suspended in a first fluidized bed 4 which in turn is contained in a first fluidized bed reactor vessel 6 having gas inlet means 8 and gas outlet means 10 so that the fluidized bed 4 can be maintained in a fluidized state.

The first fluidized bed reactor vessel 6 is immersed in a second fluidized bed 14 which bed is contained in a second fluidized bed reactor 16, the second reactor having gas inlet means 18 and gas outlet means 20 so that the fluidized bed 14 can be maintained in a fluidized state.

Temperature sensing means 24 such as a thermocouple is operably connected with the fluidized bed 4 and positioned above the process vessel 2 and with a temperature readout and control means 26, which control means is operably connected with temperature heating means 28 so that the temperature of the second fluidized bed 14 can be adjusted to be equal to the temperature of the first fluidized bed 4.

The gas inlet means 8 of the first fluidized bed reactor 6 should have heating means 12 which can be a pipe 12 of sufficient length which act as a heat exchanger or contains electrical heating means such that the temperature of the gas entering the first fluidized bed reactor 6 is equal to the temperature of the second fluidized bed 14.

My novel apparatus in effect prevents heat loss or transfer from the first fluidized bed 4 into the second fluidized bed 14 since their temperatures are maintained equal by the heating means 28. The amount of heat released caused by the carrying out of exothermic reactions will be directly and proportionally reflected in a temperature rise in the first fluidized bed. The apparatus can readily be calibrated by carrying out reactions having known heat releases or by electrical means and observing the temperature rise of the first fluidized bed 4 and thereafter it can be employed as an adiabatic calorimeter wherein the temperature rise in the first fluidized bed can be utilized to calculate the amount of heat released in the reaction being studied.

From the foregoing it will be obvious to those skilled in the art that such a calorimeter can operate at high temperatures, e.g. 1000° C., the operating limitations being determined by the integrity of the bed material, electrical heaters and materials of construction.

I claim:
1. An adiabatic calorimeter for use in accurately measuring the thermal effects of processes at high temperature comprising:
  (a) first and second fluidized bed reactors having fluidized beds of particulate solids fluidized by gaseous fluidizing mediums contained in separate walled reactor vessels having separate fluidizing mediums and separate medium inlet and egress means for each reactor;
  (b) the walls of the vessel of the first reactor being completely immersed in the fluidized bed of the second reactor;
  (c) two independent temperature sensing means capable of measuring the temperature of the fluidized bed in the first reactor and the fluidized bed of the second reactor;
  (d) heating means operably connected with both of the temperature sensing means and with the fluidized bed of the second reactor and capable of maintaining the second fluidized bed at a temperature equal to that of the first fluidized bed;

(e) a process vessel, immersed in the first fluidized bed below the temperature sensing means, for carrying out processes generating a thermal effect; and (f) heat exchange means capable of equalizing the temperature of the gas flowing into the first fluidized bed to the temperature of the second fluidized bed.

References Cited

UNITED STATES PATENTS

| | | | |
|---|---|---|---|
| 1,247,998 | 11/1917 | Parr | 73—191 |
| 3,267,728 | 8/1966 | Solomons | 73—190 |

JAMES J. GILL, Primary Examiner

H. GOLDSTEIN, Assistant Examiner